US008279356B2

(12) United States Patent
Shintani et al.

(10) Patent No.: US 8,279,356 B2
(45) Date of Patent: Oct. 2, 2012

(54) ACTIVE SUPPRESSION BY TV OF WHITE SPACE DEVICE INTERFERENCE

(75) Inventors: Peter Shintani, San Diego, CA (US); Robert Blanchard, Escondido, CA (US); Koichi Oshima, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 622 days.

(21) Appl. No.: 12/498,892

(22) Filed: Jul. 7, 2009

(65) Prior Publication Data
US 2011/0007226 A1    Jan. 13, 2011

(51) Int. Cl.
*H04N 5/50* (2006.01)
(52) U.S. Cl. .......................... 348/735; 348/734; 725/133
(58) Field of Classification Search .......... 348/734–735; 725/78–85, 131–134, 139–142, 151–153
See application file for complete search history.

(56) References Cited

U.S. PATENT DOCUMENTS

| 5,142,405 | A | 8/1992 | Hornbeck | |
|---|---|---|---|---|
| 6,107,938 | A * | 8/2000 | Du et al. | 340/12.22 |
| 6,266,816 | B1 * | 7/2001 | Watson et al. | 725/120 |
| 6,892,054 | B2 * | 5/2005 | Belcher et al. | 455/63.1 |
| 7,013,145 | B1 * | 3/2006 | Centore, III | 455/454 |
| 7,385,768 | B2 | 6/2008 | Wo et al. | |
| 7,482,273 | B1 | 1/2009 | Klein et al. | |
| 7,567,635 | B2 * | 7/2009 | Scheim et al. | 375/341 |
| 7,944,903 | B2 * | 5/2011 | Wang et al. | 370/342 |
| 2006/0065940 | A1 | 3/2006 | Kothari | |
| 2007/0133023 | A1 | 6/2007 | Wicker | |
| 2009/0117859 | A1 | 5/2009 | Smith et al. | |
| 2010/0172634 | A1 * | 7/2010 | Devictor et al. | 386/123 |

FOREIGN PATENT DOCUMENTS

| EP | 911906 | 3/2006 |
|---|---|---|
| WO | 2008114216 | 9/2008 |

OTHER PUBLICATIONS

"LG's 52-inch 52LG71 LCD TV boasts WiFi for HD streaming", http://www.engadget.com/2007/11/14/lgs-52-inch-52lg71-lcd-tv-boasts-wifi-for-hd-streaming/, Nov. 14, 2007.
"Linux powers WiFi-equipped LCD-TV,", http://www.linuxdevices.com/news/NS8228701721.html, Jan. 11, 2006.

* cited by examiner

*Primary Examiner* — Annan Shang
(74) *Attorney, Agent, or Firm* — John L. Rogitz

(57) ABSTRACT

A digital TV (DTV) incorporates a TV white space device capable of operating on plural TV frequencies and responsive to the DTV processor to send a signal to an interfering white space device nearby the DTV that is interfering with a TV channel being presented on the TV. The signal sent from the TV white space device to the interfering white space device alters operation of the interfering white space device so as to reduce if not eliminate the interference.

18 Claims, 2 Drawing Sheets

ACTIVE SUPPRESSION BY TV OF WHITE SPACE DEVICE INTERFERENCE

FIELD OF THE INVENTION

The present application relates generally to the active suppression, by a TV, of white space device interference.

BACKGROUND OF THE INVENTION

Various proposals have advanced the concept of using unallocated channels within the TV frequency bands, often referred to as "white spaces", that are a result of the Federal Communication Commission's channel allocation scheme. A device intended to use such unallocated or unassigned channels is referred to as a white-space device (WSD). These (currently) unlicensed devices are proposed to provide services such as wireless broadband Internet access, and have been defended based on a projected capability to detect the presence of existing signals, such as TV stations and other wireless users, and to then avoid the use of active channels.

Thus, a principal premise of white spaces devices is that through some technique that either by a geographical data base in conjunction with GPS or through channel detection (spectrum sensing) determines that a channel or a number of channels are occupied by incumbent broadcast stations. Through such techniques it is envisioned that a white spaces device will be able to detect and use an unused channel. However, as understood herein, even with such techniques white space devices may nevertheless cause interference with nearby digital and legacy TVs (DTVs), including causing, at the DTV, freeze frames, pixilation, and even a complete loss of picture.

SUMMARY OF THE INVENTION

A digital TV (DTV) includes a TV processor communicating with a TV tuner and a TV display controlled by the TV processor to present video signals received from the TV tune. Through the tuner and demodulator, the TV processor is programmed to detect interference from a white space device and to cause a suppression signal to be transmitted to the white space device to suppress the interference.

In example embodiments a TV chassis holds the TV display and an (internal) TV white space device (establishing a transceiver) is supported by the TV chassis. The TV white space device is responsive to the TV processor to transmit the suppression signal. The suppression signal may include information identifying at least one channel actually or potentially interfered with by the white space device and/or a geographic location of the DTV. The suppression signal transmitted by the TV white space device alternatively may be a non-data interference signal on an interfered-with channel to cause other white space devices to navigate transmission away from the interfered-with channel.

If desired, the TV white space device can receive, over a wide area data network, audio/video content for presentation thereof on the TV display. Also, the TV white space device may receive software updates for the TV processor over a wide area data network. In some embodiments the TV white space device is caused to transmit the suppression signal only when the TV displays a terrestrial broadcast signal, and otherwise never transmits the suppression signal. In other embodiments the suppression signal may be transmitted when interference is sensed only when receiving a terrestrial broadcast signal and/or a cable TV signal. The suppression signal may be transmitted only when interference is sensed on a currently tuned-to channel.

In another aspect, a method includes providing a digital TV (DTV) and programming the DTV to modify operation of an interfering white space device operating on or near an interfered-with TV channel and thereby actively protect channels of DTV interest.

In another aspect, an apparatus includes a TV chassis and a digital TV (DTV) tuner supported on the chassis. A display is supported on the chassis for presenting video from the DTV tuner. A TV white space device is supported on the chassis and is capable of operating on plural TV frequencies.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
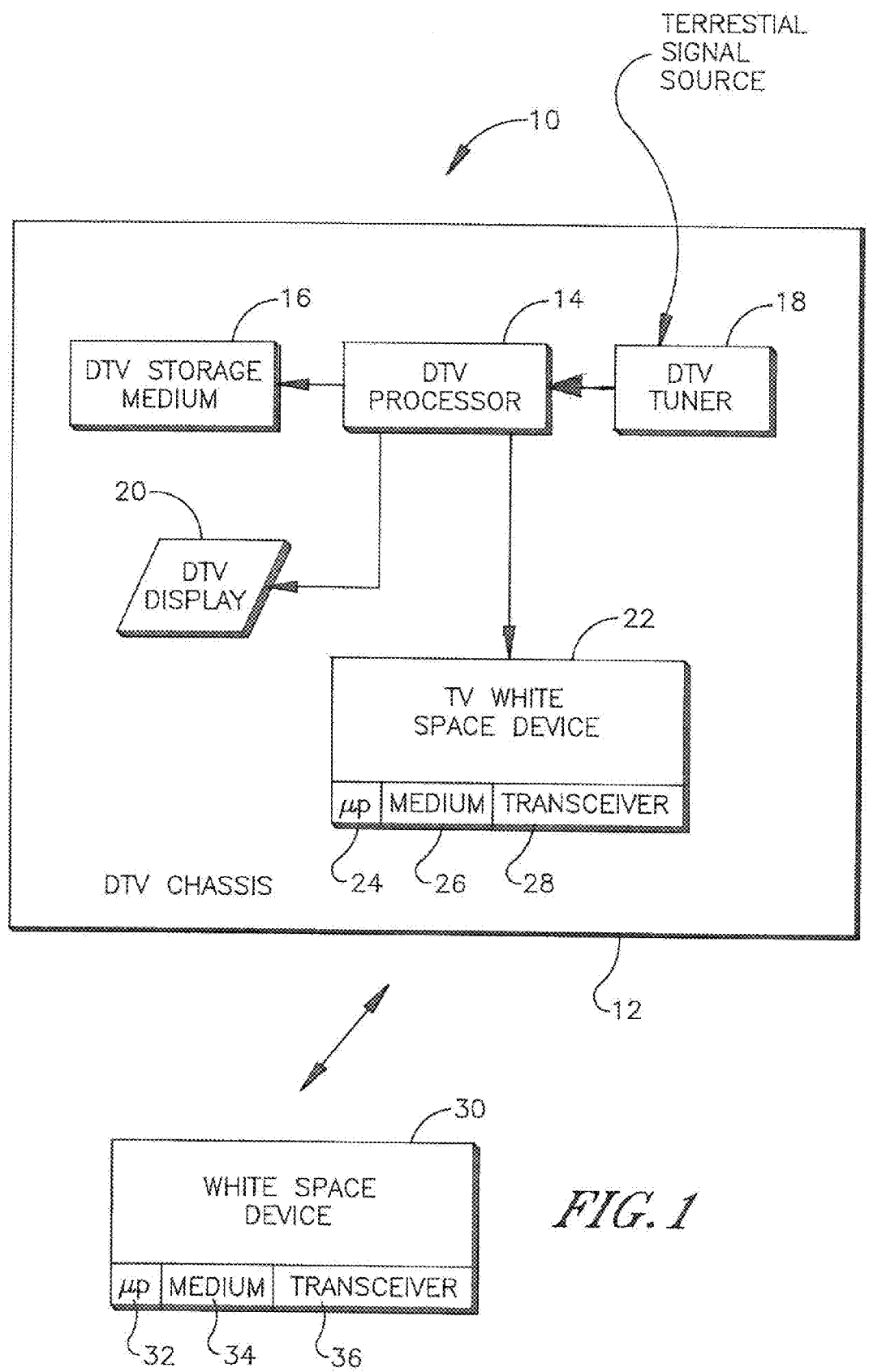
FIG. 1 is a block diagram of an example system in accordance with present principles.

FIG. 1 shows a digital TV (DTV) 10 that has a TV chassis 12 holding a TV processor 14 accessing a TV computer-readable medium 16 such as but not limited to disk-based or solid state storage. The medium 16 may contain logic executable by the TV processor 14 in accordance with disclosure below. A DTV tuner 18, which may be in the chassis 12 or in a separate set-top box, receives TV signals from one or more TV signal sources including, e.g., a terrestrial broadcast signal source, and the TV processor 14 causes TV signals from a selected channel received by the tuner 18 to be presented on a TV display 20.

In accordance with present principles, the DTV 10 can alter operation of a nearby white space device (WSD) to reduce if not eliminate interference from the nearby WSD. In the example embodiment shown in FIG. 1, a TV WSD 22 is provided on the chassis 12 for this purpose. As shown, the TV WSD 22 includes a TV WSD processor 24 accessing a TV WSD computer readable medium 26 such as disk-based or solid state storage. The TV WSD 22 also includes a TV WSD transceiver 28 controlled by the TV WSD processor 24 in accordance with disclosure below. The TV WSD transceiver 28, which may communicate with a wide area data network using, e.g., WiFi principles, operates in the TV frequency band and may transmit on multiple TV frequencies, with the TV WSD processor 24 controlling which frequency is being used by the TV WSD transceiver 28. It is to be understood that in some embodiments the TV WSD processor 24 may act in conceit with the TV processor 14 to undertake present principles, or the TV WSD processor 24 may be eliminated altogether and its functions undertaken by the TV processor 14.

As shown in FIG. 1, one or more potentially interfering WSD 30 maybe sufficiently near the TV 10 to cause interference on a TV channel actually being used or potentially being displayed by the TV 10. The WSD 30 typically includes a WSD processor 32 accessing a WSD computer readable medium 34 such as disk-based or solid state storage. The WSD 30 also includes a WSD transceiver 36 controlled by the WSD processor 32. The WSD transceiver 36 operates in the TV frequency band and may transmit on multiple TV frequencies, with the WSD processor 32 controlling which frequency is being used by the WSD transceiver 36.

When the TV 10 is connected to a terrestrial antenna or signal source, the TV is capable of determining the presence of terrestrial broadcast signals, typically done through channel scanning during set-up. The TV medium 16 stores the frequencies (physical channel numbers) and other channel data of the receivable channels.

Figure 2:
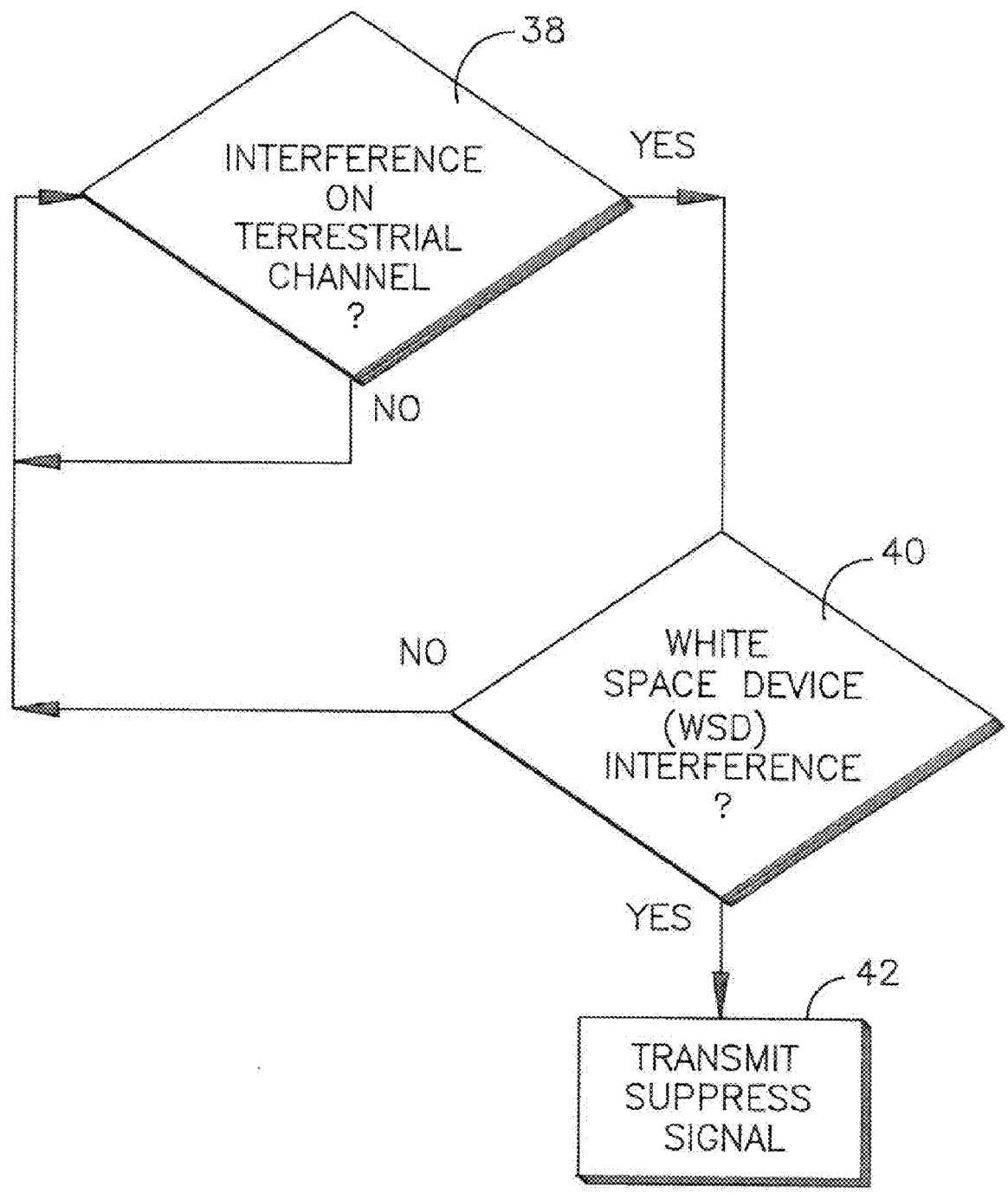
FIG. 2 is a flow chart of example logic that may be employed by the system of FIG. 1.

FIG. 2 shows that at decision diamond 38, if it is determined that the TV 10 is having difficulty receiving a cable or broadcast signal that was previously receivable it may move to decision diamond 40 to determine if the reception difficulty is from interference that is characteristic of the transmission signature of a white space device, e.g., the WSD 30. If both tests are positive the logic moves to block 42 to suppress the interfering signal from the WSD 30. If desired, the logic of FIG. 2 may be implemented only when the TV seeks to present TV signals from a terrestrial signal; otherwise, e.g., when the TV is presenting satellite signals, the logic need not be invoked. In other embodiments FIG. 2 may be implemented when the TV receives TV signals over a cable.

An example protocol for suppressing interference caused by, e.g., the WSD 30 is for the TV processor 14 to cause the TV WSD 22 to actively transmit a suppression signal to the interfering WSD 30. The suppression signal may include information identifying the interfered channel or indeed all of the channels, and in some cases only all of the terrestrial broadcast channels, detected by the TV as being available during the above-mentioned scan. Using this information the interfering WSD 30 can alter its operation to use a channel sufficiently removed (e.g., by three or more channel numbers) from the interfered-with channel or sufficiently removed from any channel detected in the set-up scan to reduce if not eliminate interference with the TV 10.

In addition to or in lieu of identifying the interfered-with channel, the suppression signal may include information pertaining to the geographic location of the TV as might be received from, e.g., a global position satellite (GPS) receiver on the TV. Using the geographic information the WSD 30 can access its storage medium 34 to correlate the geographic position of the TV to a channel map. Using the channel map the interfering WSD 30 can alter its operation to use a channel sufficiently removed (e.g., by three or more channel numbers) from any channel on the map to reduce if not eliminate interference with the TV 10.

Yet again, the suppression signal may simply be a noise signal generated by the TV WSD 22 on the same frequency as the one being used by the interfering WSD 30, which, based on the signal from the TV WSD 22, determines that the channel is occupied, forcing the interfering WSD 30 to navigate transmission away from that channel. In any case, it may now be appreciated that the above logic allows the TV 10 to actively protect the channels of interest and not have reception of channels interfered by white space devices 30.

In addition, the TV WSD 22 may be used for additional functions. Non-limiting examples of such additional functions include receiving video or other content for presentation on the TV 10, receiving software updates for the TV processor 14, etc.

In some implementations, the suppression signal from the TV WSD may bear characteristics such as fields identifying itself as "from a TV" so that if it is detected by other TVs nearby, the other TVs can activate their WSDs and propagate the message to the interfering WSD. This improves the likelihood that the interfering WSD receives the suppression signal. A time-out period, message sequence number, or other feature may be provided in such implementations to prevent looping the message among the cluster of TVs. For example, a TV might propagate a suppression signal once only within any five minute period, or it might propagate a suppression signal having a particular message sequence number only once.

While the particular ACTIVE SUPPRESSION BY TV OF WHITE SPACE DEVICE INTERFERENCE is herein shown and described in detail, it is to be understood that the subject matter which is encompassed by the present invention is limited only by the claims.

What is claimed is:

1. Digital TV (DTV) comprising:
   TV processor communicating with a TV tuner;
   TV display controlled by the TV processor to present video signals received from the TV tuner;
   wherein the TV processor is programmed to detect interference from a white space device and to cause a suppression signal to be transmitted from a transmitter associated with the TV to the white space device to suppress the interference.

2. The DTV of claim 1, comprising a TV chassis holding the TV display and a TV white space device supported by the TV chassis, the TV white space device establishing the transmitter associated with the TV and being responsive to the TV processor to transmit the suppression signal.

3. The DTV of claim 2, wherein the suppression signal transmitted by the TV white space device is an interference signal on an interfered-with channel to cause other white space devices to navigate transmission away from the interfered-with channel.

4. The DTV of claim 2, wherein the TV white space device receives over a wide area data network audio/video content for presentation thereof on the TV display.

5. The DTV of claim 2, wherein the TV white space device receives software updates for the TV processor over a wide area data network.

6. The DTV of claim 2, wherein the TV white space device is caused to transmit the suppression signal only when the TV displays a terrestrial broadcast signal or a cable TV signal, and otherwise never transmits the suppression signal.

7. The DTV of claim 1, wherein the suppression sisal includes information identifying at least one channel actually or potentially interfered with by the white space device and/or a geographic location of the DTV.

8. The DTV of claim 1, wherein the suppression signal identifies itself as "from a TV" so that if it is detected by other TVs, said other TVs activate respective white space devices and propagate the message to improve the likelihood that an interfering WSD receives the suppression signal.

9. Method, comprising:
   providing a digital TV (DTV); and
   programming the DTV to modify operation of an interfering white space device operating on or near an interfered-with TV channel and thereby actively protect channels of DTV interest, wherein the DTV includes a TV white space device supported on a chassis of the DTV, wherein the DTV, in response to detecting white space device interference on a terrestrial TV channel being received by the DTV, causes the TV white space device to transmit a suppression signal to the interfering white space device to suppress the interference.

10. The method of claim 9, wherein the suppression signal includes information identifying a channel interfered with by the interfering white space device.

11. The method of claim 9, wherein the suppression signal includes information identifying a geographic location of the DTV.

12. The method of claim 9, wherein the suppression signal transmitted by the TV white space device is an interference signal on an interfered-with channel to cause the interfering white space device to navigate transmission away from the interfered-with channel.

13. The method of claim 9, wherein the TV white space device receives audio/video content for presentation thereof on the TV display.

14. The method of claim 9, wherein the TV white space device receives software updates for the TV processor.

15. The method of claim 9, wherein the TV white space device is caused to transmit the suppression signal only when the TV displays a terrestrial broadcast signal or a cable TV signal, and otherwise never transmits the suppression signal.

16. Apparatus comprising:
TV chassis;
digital TV (DTV) tuner supported on the chassis;
display supported on the chassis and presenting video from the DTV tuner; and
TV white space device supported on the chassis and capable of operating on plural TV frequencies, wherein the TV white space device is responsive to a processor to send a signal to an interfering white space device nearby the chassis that causes interference with a TV channel being presented on the display, the signal sent from the TV white space device to the interfering white space device altering operation of the interfering white space device to reduce the interference.

17. The apparatus of claim 16, wherein the signal includes information identifying a channel interfered with by the interfering white space device, and/or information identifying a geographic location of the chassis.

18. The apparatus of claim 16, wherein the signal transmitted by the TV white space device is an interference signal on an interfered-with channel to cause the interfering white space device to navigate transmission away from the interfered-with channel.

\* \* \* \* \*